June 15, 1948.   J. K. DUNCAN   2,443,417
VAPORIZER
Filed Oct. 10, 1944   2 Sheets-Sheet 2
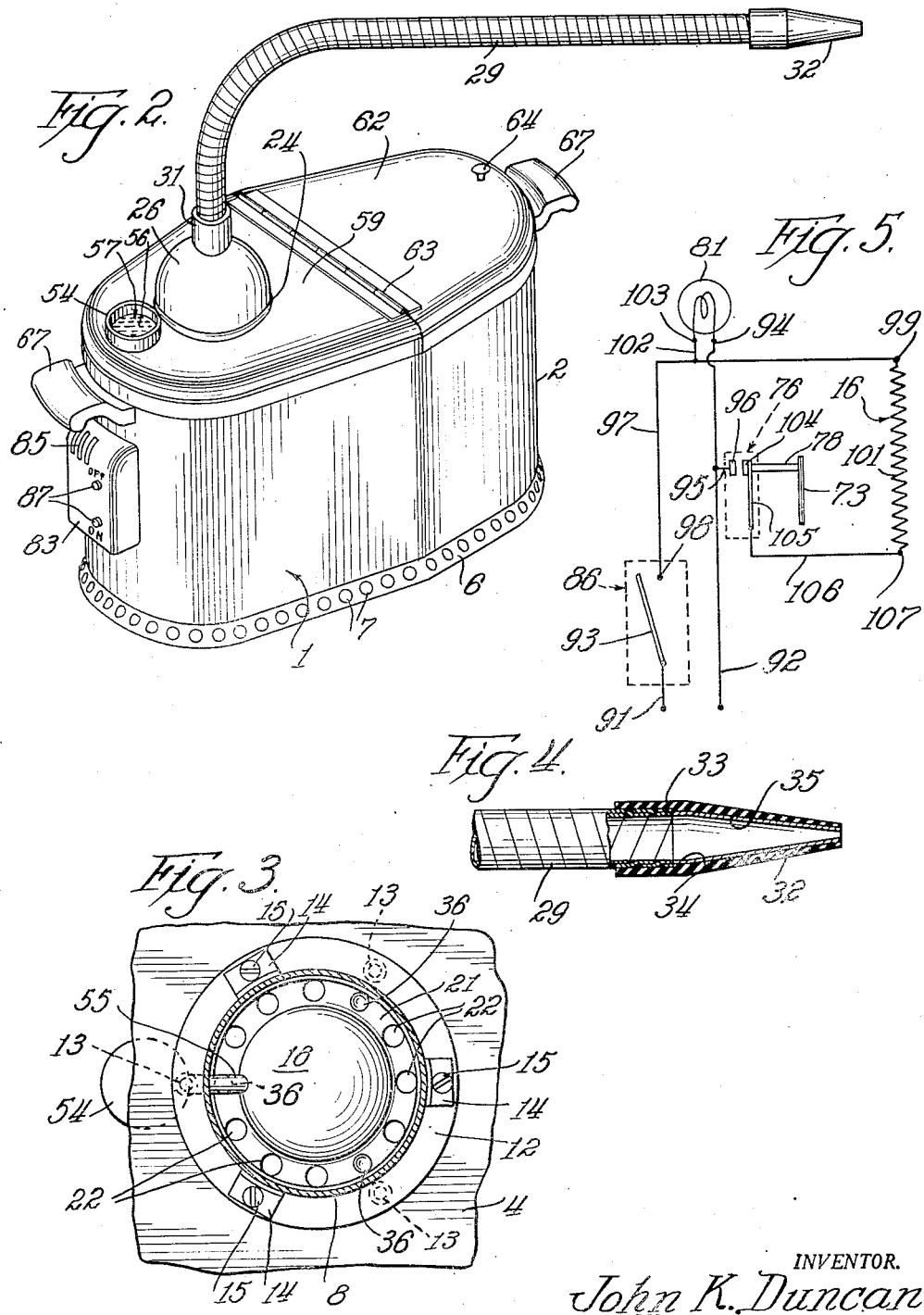
INVENTOR.
John K. Duncan
BY Robert F. Miehle
Atty.

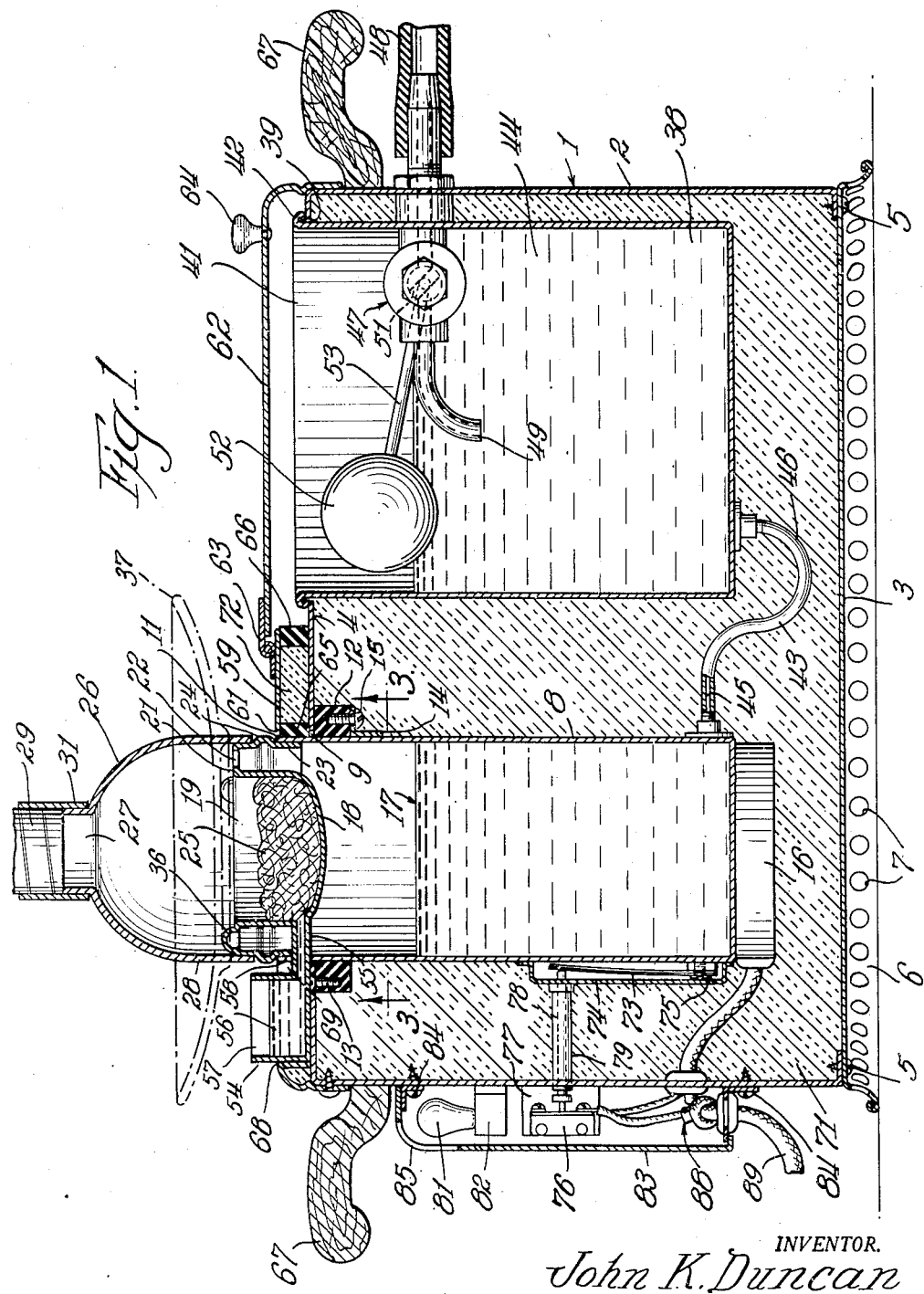

Patented June 15, 1948

2,443,417

UNITED STATES PATENT OFFICE 2,443,417

VAPORIZER

John K. Duncan, Evanston, Ill.

Application October 10, 1944, Serial No. 558,007

7 Claims. (Cl. 219—38)

My invention relates particularly to vaporizers of the heat vaporizing type such as are used for vaporizing water, medicaments, deodorants and disinfectants or the like and dispensing the same into the atmosphere.

Objects of the invention reside in the provision of a novel, efficient and practical vaporizer of the above type, which is preferably portable in character, which is convenient and quiet in use, which is insulated for the conservation of heat and for keeping external surfaces of the vaporizer cool and safe to touch, which, while providing for long periods of continuous operation, is quickly placed in operation, which conveniently provides for adjustably directing the dispensation of vapor therefrom, which is easily cleaned and is not subject to the accumulation of residues from medicaments, deodorants and disinfectants or the like used therein, which is adapted to be used for the heating of water for use and the preparation and heating of food and the maintenance of food in heated condition, which is adapted for and preferably utilizes an electric heating unit, which provides a thermostatic control for the electric heating unit desirably and efficiency combined with the vaporizer, which provides an electro-responsive signal device such as an electric signal lamp which indicates at all times whether or not the thermostatically controlled electric heating unit is connected with a source of electricity, and which is desirable from the standpoint of manufacture, repair and servicing.

The invention will be better understood by reference to the accompanying drawing forming a part hereof and in which—

Figure 1 is a partial sectional view of a vaporizer embodying a preferred form of my invention and taken in a central vertical plane of the vaporizer;

Figure 2 is a perspective view of the same;

Figure 3 is a partial sectional view taken on the line 3—3 of Figure 1;

Figure 4 is a view partially in section of the discharge end of the discharge tube and the discharge nozzle of the vaporizer, hereinafter described; and Figure 5 is a wiring diagram of the electrical devices involved in my invention.

Referring to the drawing, I designates generally a casing which is generally elliptical in horizontal cross section, the casing having a side wall 2, a bottom wall 3, and a top wall 4, the top wall 4 being formed integrally with the side wall 2 and the bottom wall 3 being detachably secured, as designated at 5, to the lower edge of the side wall. See Figures 1 and 2. The bottom wall is provided with a downwardly extending marginal flange 6 forming a base for supporting the casing in upwardly spaced relation with a supporting surface, such as a floor, and is provided with lateral ventilating openings 7, so that the transmission of heat from the bottom of the casing to the supporting surface is eliminated to a large extent.

An upright cylindrical container 8 for liquid, such as water, is disposed within the casing in the region of one end thereof and is spacedly related with the side and bottom wall of the casing to provide insulating space, and the upper end portion of the container projects upwardly through an opening 9 in the top wall 4 of the casing and is provided with a top opening 11 defined by the side wall thereof. See Figure 1.

A support ring 12 of heat insulating material, such as non-metallic material, surrounds the container 8 immediately below the top wall 4 of the casing, and is secured with the top wall 4 by means of headed screws 13 spaced angularly about the ring and extending downwardly through the top wall and screwthreaded into the ring, and is secured with the container by lugs 14 secured with the container and spaced angularly about the container and ring and screws 15 extending upwardly through the lugs and screwthreaded into the ring, so that the container is supported within the casing. See Figures 1 and 3. The screws 13 are angularly spaced about the ring from the lugs 14 and screws 15, as best shown in Figure 3, so that the ring spacedly connects the container and the top wall 4 of the casing with the result that heat transmission from the container to the top wall 4 is minimized by reason of the ring being of heat insulating material. The opening 9 of the top wall 4 spacedly surrounds the container so that the container and top wall are out of heat transmitting contact.

An electric heater of a usual type, generally designated at 16 in Figure 1, is secured in a usual manner upwardly against the bottom of the container 8 within the casing 1, and is spaced above the bottom wall 3 of the casing to provide insulating space therebetween, and serves to heat water 17 in the container to vaporize the same, the resulting vapor passing upwardly through the top opening 11 of the container.

A smaller container 18 for liquid, or a solid substance such as a medicated jelly, having a top opening 19, is provided with a support formed integrally therewith and surrounding the same, and this support comprises a horizontally extending flange portion 21 extending outwardly from the top portion of this container and provided with vertical discharge openings 22 spaced about this container and a vertically extending circumferential flange portion 23 extending downwardly from the outer periphery of the flange portion 21 and provided with an external circumferential rib 24 intermediate the top and bottom thereof. See Figures 1 and 3. The lower portion of the flange portion 23 is detachably telescopically engaged within the upper portion of the container 8 with the rib 24 engaged downwardly on the top edge of the container 8 to support the container 18 in central relation with the top opening 11 of the container 8, vapor from the container 8 passing upwardly through the discharge openings 22 of the flange portion 21 and heating the container 18 to vaporize a medicament, deodorant, disinfectant or the like in the container 18, vapor from the material in the container 18 commingling with the vapor of the water in the container 8 above the container 18 for the dispensing of the combined vapors.

The discharge openings 22 provide vertical discharge passage from the container 8 past the container 18 and are of restricted area adapted to create temperature increasing pressure in the container 8 to accelerate the vaporization of the material in the container 18 and to increase the velocity of the discharge of the commingled vapors, the discharge openings 22 preferably, as shown, having restrictive action at the top of the container 18 so that both the side and bottom of this container are subjected to the increased heat resulting from the pressure in the container 8.

As above stated, the container 18 is for liquid so that liquid therein cannot drip down into the liquid in the container 8 and form a residue therein which is troublesome to remove. Preferably, if liquid is used in the container 18, a piece of absorbent cotton 25 saturated with the liquid is placed in the container 18 to quicken vaporization. A discardable paper cup (not shown) containing medicament or the like may also be used in the container 18.

A vapor discharge cap 26, preferably in the form of a dome, is provided with a relatively small central upwardly disposed and directed discharge opening 27 and with a relatively large downwardly disposed and directed circumferential wall portion 28 detachably telescopically engaged with the upper portion of the circumferential flange portion 23 above the rib 24, so that vapors from the containers 8 and 18 are collected therein and discharged through the small discharge opening 27 at a desirably increased velocity, it being observed that the discharge openings 22 spaced about the container 18 and the discharge cap 26 serve to dampen the noise resulting from the turbulence of the boiling water in the container 8.

A deformable metallic discharge tube 29 of the interlocked spiral type has one end thereof secured, as designated at 31 in Figures 1 and 2, with the discharge cap 26 in communication with the discharge opening 27 thereof, and the other end of the discharge tube is provided with a velocity increasing discharge nozzle, see Figure 4, comprising a bored outer part 32 of heat insulating material, such as non-metallic material, having an end portion 33 of the bore thereof frictionally engaged over the tube to secure the nozzle therewith, and a metallic tapered tubular inner part 34 within the correspondingly tapered remainder 35 of the bore of the outer part and having its larger end in abutting concentric relation with the opposing end of the discharge tube and of substantially the same internal diameter as that of the tube, thus presenting a smooth non-shouldered internal surface so that vapor passing through the tube and nozzle is not interfered with and residual deposits are minimized.

By reason of the deformable character of the discharge tube 29, the discharge nozzle may be adjustably positioned to desirably direct the vapor issuing from the nozzle, and the nozzle may be adjusted by grasping the heat insulating outer part 32 of the nozzle without danger of burning the hand.

The horizontally extending flange portion 21 of the support for the smaller container 18 is provided with upwardly directed support formations 36 spaced about this container and forming a horizontal supporting plane spaced above the discharge openings 22, as best shown in Figure 1, so that, the discharge cap 26 having been removed, a food plate 37, shown in dot and dash lines in Figure 1, or the like may be placed on the support formations 36 for warming the same and food thereon by vapor passing upwardly through the discharge openings 22, the plate being spaced above the discharge openings 22 and thus not interfering with the flow of the vapor. Removal of the smaller container 18 from the top of the container 8 permits the insertion of a food receptacle, not shown, into the container 8 for the warming of the contents of the food receptacle. Also removal only of the discharge cap 26 permits of the insertion of a food receptacle, not shown, such as a nursing bottle, into the container 18 for warming the same.

An upright cylindrical reservoir 38 for liquid, such as water, see Figure 1, is disposed within the casing 1 in horizontally spaced relation with the container 8 and in the region of the end of the casing opposite that in which the container 8 is disposed and is spacedly related with the side and bottom of the casing to provide insulating space, and the upper end portion of the reservoir projects upwardly through an opening 39 in the top wall 4 of the casing and is provided with a top opening 41 for filling the same. The reservoir is suspended in the casing by an external circumferential flange 42 at the top of the reservoir, which bears downwardly on the top wall 4 of the casing.

A pipe 43 connects the lower portions of the container 8 and the reservoir 38 so that water 44 in the reservoir is fed into the container 8 to replenish the water 17 in this container as it is vaporized. As a result, a comparatively small amount of water is in the container 8, so that it is quickly heated with corresponding quickness in placing the vaporizer in operation, and once placed in operation the vaporizer will operate for a long period of time by reason of the water in the reservoir replenishing the water in the container as it is vaporized. The water in the reservoir may be replenished through the top opening 41 thereof without interrupting the operation of the vaporizer. The pipe 43 has a fluid passage 45 of restricted area to minimize feed back of heated water from the container 8 to the reservoir to conserve heat and prevent condensation in the reservoir, and a portion of the pipe 43 is of upright U-shape to form a trap, as designated at 46, to prevent passage of vapor into the reservoir 38 in case the water in the container 8 and reservoir 38 becomes nearly exhausted.

For the purpose of automatically replenishing the water in the reservoir 38 where a supply of water under pressure is available, a liquid level maintaining float valve of usual construction is arranged within the reservoir and comprises a stationary valve body 47 connected, as designated at 48, with a source of water under pressure and having its outlet 49 within the reservoir, a valve 51 pivotally mounted within the valve body, and a float 52 floating on the water in the reservoir and operatively connected with the valve by an arm 53 to open and close the valve in correspondence with the level of the water in the reservoir.

A second upright relatively small reservoir 54 for liquid, see Figures 1 and 3, is disposed in horizontally spaced relation with the container 18 outwardly of the flange portion 23 of the support of this container and outwardly of the container 8, and is secured therewith by means of a pipe 55 which connects the lower portions of the container 18 and the reservoir 54 so that liquid 56 in the reservoir is fed into the container 18 to replenish the liquid in this container as it is vaporized. As a result, a comparatively small amount of liquid is in the container 18, so that it is quickly heated with corresponding quickness in placing the vaporizer in operation, and once placed in operation the vaporizer will operate for a long period of time by reason of liquid in the reservoir 54 replenishing the liquid in the container 18. The liquid in the reservoir 54 may be replenished through the top opening 57 thereof without interrupting the operation of the vaporizer. A notch 58 at the top portion of the container 8 receives the pipe 55.

The casing I is provided with a second top wall above the top wall 4 and comprising one portion 59 fixed with the casing I in upwardly spaced relation with the top wall 4 to provide insulating space and disposed in the region of the container 8 and provided with an opening 61 spacedly surrounding this container and a second portion 62 overlying the reservoir 38 to provide a cover therefor and hinged to the portion 59, as designated at 63, so that the cover may be raised upwardly out of overlying relation with this reservoir to provide access thereto, the cover being provided with a manipulating knob 64.

A ring 65 of heat insulating material, such as non-metallic material, surrounds the container 8 between the top wall 4 and the second top wall portion 59, and a strip 66 of similar heat insulating material is secured between the top wall 4 and the second top wall portion 59 at the juncture between the second top wall portions 59 and 62. The casing I is provided with handles 67 at the upper portions of opposite ends thereof so that the vaporizer may be conveniently carried.

The second top wall portion 59 is provided with an opening 68 for receiving the reservoir 54 and the pipe 55, and the insulating ring 65 is provided with a slot 69 for receiving the pipe 55, this opening and slot and the notch 58 of the container 8 permitting the installation and removal of the container 18 and reservoir 54 as a unit.

The insulating spaces within the main portion of the casing and surrounding the container 8 and reservoir 38 and between the heater 16 and the bottom wall 3 of the casing and between the top wall 4 and the second top wall portion 59 are filled with conformable heat insulating material, such as rock wool, as respectively designated at 71 and 72, so that not only is heat conserved but the danger of burning the user by touching the casing is eliminated.

A thermostat 73, of the bimetallic strip type, within the casing I and enclosed within a casing 74 secured on the exterior of the container 8, is mounted, as designated at 75, exteriorly of and adjacent the lower portion of the side of the container 8 to be responsive to heat therein. See Figure 1. An electric switch, generally designated at 76, is mounted, as designated at 77, on the exterior of the casing I, and a horizontally disposed longitudinally movable rod 78 is operative between the thermostat and switch to control the switch from the thermostat as hereinafter explained, the rod being slidably mounted in a horizontal tube 79 secured on the casing 74 and extending through the side wall of the casing I. A signal lamp 81 is mounted on the exterior of the casing I adjacent the switch 76 in a usual socket 82 secured on the side wall of this casing, and a casing 83 is detachably mounted, as designated at 84, on the exterior of the side wall of the casing I and encloses the switch 76 and lamp 81, the casing 83 being provided with openings 85 through which light from the lamp passes. Another electric switch of usual construction, diagrammatically illustrated at 86 in Figure 5, is also mounted within the casing 83 and is provided with usual push buttons 87 accessible from the exterior of this casing for manually opening and closing this switch.

The electrical circuit connections of the electrical devices of the vaporizer are generally designated at 88 in Figure 1 and include a usual extension cord 89 leading exteriorly from the casing 83 for connection with an electric current source such as an electric service outlet.

Referring to Figure 5, the extension cord 89 comprises two conductors 91 and 92 of which the conductor 91 is connected to one contact 93 of the switch 86, and of which the conductor 92 is connected with one terminal 94 of the lamp 81 and is connected by a branch conductor 95 with one contact 96 of the switch 76. A conductor 97 is connected with the other contact 98 of the switch 86 and with one terminal 99 of the heating element 101 of the heater 16 and by a branch conductor 102 with the other terminal 103 of the lamp 81. The other contact 104 of the switch 76 is secured on and is in conductive relation with a metallic spring blade 105 forming a conductor for movement of the contact 104 into and out of contact with the contact 96 and is yieldably urged out of contact therewith by the spring blade, and a conductor 106 is connected with the blade 105 and with the other terminal 107 of the heating element 101.

Accordingly, the switch 76 is connected in series with the heating element 101 of the heater 16 for controlling the same, and the thermostat 73 is operative through the rod 78 to close the switch 76 and pass current through the heating element 101 to heat the container 8 and the liquid 17 therein for vaporizing the liquid and to open the switch 76 to interrupt the passage of current through the heating element 101 when the temperature in the container 8 rises above the desired vaporizing temperature. Thus, an automatic temperature control is provided which not only maintains the desired vaporizing temperature but also protects the container 8 from damage from overheating in case there is no liquid in this container.

The manually controlled switch 86 is also connected in series with the heating element 101 so that the vaporizer may be conveniently placed in or out of operation thereby. The signal lamp 81 is connected in parallel with the thermostatically controlled switch 76 and preferably in parallel with the circuit portion comprising the switch 76 and heater element 101 in series connection so that it is energized when the vaporizer is connected with a current source as when the switch 86 is closed and is not energized when the vaporizer is not connected with a current source as when the switch 86 is open, so that the lamp indicates whether or not the vaporizer is connected with a current source irrespective of whether or not the thermostatically controlled switch 76 is open or closed with obvious advantage.

While I have thus described my invention, I do not wish to be limited to the precise details described, as changes may be readily made without departing from the spirit of my invention, but having thus described my invention, I claim as new and desire to secure by Letters Patent the following:

1. In a vaporizer, the combination of a first container for liquid in which liquid is vaporized by heat and provided with a relatively large upper portion and top opening, a relatively small second container for liquid and provided with a top opening and supported upwardly within said first container, and vapor discharge means exterior of said second container and providing vertical discharge passage from said first container past said second container and said discharge passage being of restricted area adapted to create temperature increasing pressure in said first container.

2. In a vaporizer, the combination of a first container for liquid in which liquid is vaporized by heat and provided with a relatively large upper portion and top opening, a relatively small second container for liquid and provided with a top opening, and a support surrounding said second container for supporting the same upwardly within and in central relation with said first container and provided with vertical vapor discharge openings of restricted area spaced about said second container and providing vertical discharge passage from said first container past said second container adapted to create temperature increasing pressure in said first container.

3. In a vaporizer, the combination of a first container for liquid in which liquid is vaporized by heat and provided with a relatively large upper portion and top opening, a relatively small second container for liquid and provided with a top opening, and a support fixed with and surrounding said second container for supporting the same upwardly within and in central relation with said first container and provided with vertical vapor discharge openings spaced about said second container and provided with a vertically extending circumferential surface detachably telescopically engaged with said first container and said discharge openings being of restricted area and providing vertical discharge passage from said first container past said second container adapted to create temperature increasing pressure in said first container.

4. In a vaporizer, the combination of a first container for liquid in which liquid is vaporized by heat and provided with a relatively large upper portion and top opening, a relatively small second container for liquid and provided with a top opening, a support surrounding said second container for supporting the same upwardly within and in central relation with said first container and provided with vertical discharge openings spaced about said second container and provided with a vertically extending circumferential surface the lower portion of which is detachably telescopically engaged with said first container and said discharge openings being of restricted area and providing vertical discharge passage from said first container past said second container adapted to create temperature increasing pressure in said first container, and a vapor discharge cap provided with an upwardly disposed discharge opening and with a downwardly directed circumferential wall portion detachably telescopically engaged with the upper portion of said circumferential surface of said support.

5. In a vaporizer, the combination of a first container for liquid in which liquid is vaporized by heat and provided with a relatively large upper portion and top opening, a relatively small second container for liquid and provided with a top opening, and a support surrounding said second container for supporting the same upwardly within and in central relation with said first container and provided with vertical discharge openings spaced about said second container and provided with upwardly directed support formations spaced about said second container and forming a horizontal supporting plane spaced above said discharge openings and said discharge openings being of restricted area providing vertical discharge passage from said first container past said second container adapted to create temperature increasing pressure in said first container.

6. In a vaporizer, the combination of a first container for liquid in which liquid is vaporized by heat and provided with a relatively large upper portion and top opening, a relatively small second container for liquid and provided with a top opening, and a support surrounding said second container for supporting the same upwardly within and in central relation with said first container and comprising a horizontally extending flange portion extending outwardly from said second container and provided with vertical discharge openings spaced about said second container and a vertically extending circumferential flange portion extending from the outer periphery of said first mentioned flange portion and detachably telescopically engaged with said first container and said discharge openings being of restricted area providing vertical discharge passage from said first container past said second container adapted to create temperature increasing pressure in said first container.

7. In a vaporizer, the combination of a first container for liquid in which liquid is vaporized by heat and provided with a relatively large upper portion and top opening, a relatively small second container for liquid and provided with a top opening, a support surrounding said second container for supporting the same upwardly within and in central relation with said first container and comprising a horizontally extending flange portion extending outwardly from the top portion of said second container and provided with vertical discharge openings spaced about said second container and a vertically extending circumferential flange portion extending downwardly from the outer periphery of said first mentioned flange portion and having its lower portion detachably telescopically engaged with said first container and said discharge openings being of restricted area providing vertical discharge passage from said first container past said second container adapted to create temperature increasing pressure in said first container, and a vapor discharge cap provided with a relatively small upwardly disposed discharge opening and with a relatively large downwardly disposed and directed circumferential wall portion detachably telescopically engaged with the upper portion of said circumferential flange portion.

JOHN K. DUNCAN.

REFERENCES CITED

The following references are of record in the file of this patent:

UNITED STATES PATENTS

| Number | Name | Date |
|---|---|---|
| 1,756,053 | Colton | Apr. 29, 1930 |
| 1,818,692 | Class | Aug. 11, 1931 |
| 2,024,454 | Justheim | Dec. 17, 1935 |
| 2,061,143 | Fischer | Nov. 17, 1936 |
| 2,062,613 | Schleimer | Dec. 1, 1936 |
| 2,136,085 | Roe et al. | Nov. 8, 1938 |
| 2,182,826 | Zummach | Dec. 12, 1939 |
| 2,211,407 | Christensen | Aug. 13, 1940 |
| 2,235,911 | Wilcox | Mar. 25, 1941 |